United States Patent
Havimäki et al.

(10) Patent No.: US 9,747,731 B2
(45) Date of Patent: Aug. 29, 2017

(54) METHOD AND APPARATUS IN CONNECTION WITH FORESTRY MACHINE

(75) Inventors: Esko Havimäki, Mieto (FI); Jani Savuoja, Tampere (FI); Niko Ranta, Tampere (FI)

(73) Assignee: PONSSE OYJ, Vierema (FI)

(*) Notice: Subject to any disclaimer, the term of this patent is extended or adjusted under 35 U.S.C. 154(b) by 691 days.

(21) Appl. No.: 13/512,068

(22) PCT Filed: Nov. 25, 2010

(86) PCT No.: PCT/FI2010/050962
§ 371 (c)(1),
(2), (4) Date: Sep. 7, 2012

(87) PCT Pub. No.: WO2011/064453
PCT Pub. Date: Jun. 3, 2011

(65) Prior Publication Data
US 2012/0323453 A1 Dec. 20, 2012

(30) Foreign Application Priority Data
Nov. 26, 2009 (FI) .................... 20090447

(51) Int. Cl.
*G07C 5/00* (2006.01)
*G07C 5/08* (2006.01)
(Continued)

(52) U.S. Cl.
CPC ............ *G07C 5/0816* (2013.01); *A01G 1/00* (2013.01); *A01G 23/00* (2013.01); *G07C 5/085* (2013.01)

(58) Field of Classification Search
CPC ......... E02F 9/264; E02F 9/2203; E02F 9/028; E02F 3/431; E02F 9/2004; E02F 9/2025;
(Continued)

(56) References Cited

U.S. PATENT DOCUMENTS 3,347,092 A * 10/1967 Stutson ............... G01F 9/001
701/123
5,075,693 A * 12/1991 McMillan et al. .......... 342/457
(Continued)

FOREIGN PATENT DOCUMENTS

CA 2330979 A1 8/2001
EP 0 177 020 A2 4/1986
(Continued)

OTHER PUBLICATIONS

Palmoth, L. et al., "Intelligent coaching of mobile working machine operators". Proceedings of the International Conference on Intelligent Engineering Systems, 2009 (INES 2009), Barbados, Apr. 16-18, 2009, 149-154, 8 pgs.
(Continued)

*Primary Examiner* — Behrang Badii
*Assistant Examiner* — Daniel L Greene
(74) *Attorney, Agent, or Firm* — Birch, Stewart, Kolasch & Birch, LLP

(57) ABSTRACT

An apparatus comprising means for collecting data measured from operation and/or a state of a forestry machine and/or describing an environment thereof, which date may consist of one or more parameters, means for processing the collected data, and means for influencing, on the basis of the processed data, one or more parameters controlling the operation of the forestry machine or for conveying feedback or an instruction or a prompt to a driver to change his or her control.

28 Claims, 6 Drawing Sheets

(51) Int. Cl.
*A01G 1/00* (2006.01)
*A01G 23/00* (2006.01)

(58) Field of Classification Search
CPC ....... E02F 3/3414; E02F 3/3681; E02F 3/434;
E02F 9/2029; E02F 9/2037; E02F 9/2087;
E02F 9/2095; E02F 9/2235; E02F 9/2242;
E02F 9/225; G07C 5/0816; G07C 5/085;
A01G 1/00; A01G 23/00
USPC .... 701/50, 480, 521, 534; 37/340, 399, 406,
37/413–419; 56/10.2 A–10.2 G
See application file for complete search history.

(56) References Cited

U.S. PATENT DOCUMENTS

| | | | | |
|---|---|---|---|---|
| 5,835,008 | A | * 11/1998 | Colemere, Jr. | ........ B60Q 1/441 340/439 |
| 6,182,725 | B1 | 2/2001 | Sörvik | |
| 8,180,532 | B2 | * 5/2012 | O'Halloran et al. | ........... 701/49 |
| 2003/0144779 | A1 | * 7/2003 | Obayashi | .............. B60R 16/023 701/36 |
| 2005/0133115 | A1 | 6/2005 | Gatz | |
| 2005/0283295 | A1 | * 12/2005 | Normann | ................. E02F 9/26 701/50 |
| 2006/0220883 | A1 | 10/2006 | Matos | |
| 2008/0221784 | A1 | * 9/2008 | Ezra | .............................. 701/123 |
| 2008/0294342 | A1 | * 11/2008 | Hoshizaki et al. | ........... 701/216 |
| 2008/0312833 | A1 | * 12/2008 | Greene et al. | ................ 701/301 |
| 2009/0267777 | A1 | 10/2009 | Kumar et al. | |
| 2009/0299707 | A1 | * 12/2009 | Putkonen | ............... G06Q 10/06 703/2 |
| 2014/0298259 | A1 | * 10/2014 | Meegan | .............. G06F 3/04817 715/810 |

FOREIGN PATENT DOCUMENTS

| | | |
|---|---|---|
| EP | 0974262 A1 | 1/2000 |
| FI | 20055266 A | 12/2006 |
| FR | 2918326 * | 7/2007 |
| RU | 280757 A1 | 1/1971 |
| WO | WO 2006/128786 A1 | 12/2006 |

OTHER PUBLICATIONS

Suzuki, S. & Harashima, F., "Analysis of machine operation skills using hand discrete movement". Proceedings of the IEEE International Conference on Emerging Technologies and Factory Automation, 2008 (ETFA 2008), Hampuri Sep. 15-18, 2008, 156-163, 10 pgs.

Suzuki, S. et al., "Assist Control and its Tuning Method for Haptic System". Proceedings of the 9th IEEE International Workshopon Advanced Motion Control, 2006 (AMC'06), Istanbul, Mar. 27-29, 2006. 374-379. 8 pgs.

Tervo, K. et al., "Skill Evaluation of Human Operatos in Partly Automated Mobile Working Machines". IEEE Transactions on Automation Science and Engineering, vol. 7, No. 1, 133-142, 14 pgs.

* cited by examiner

METHOD AND APPARATUS IN CONNECTION WITH FORESTRY MACHINE

FIELD

The invention relates to a method and an apparatus in connection with a forestry machine. Particularly, the invention relates to monitoring and/or controlling operation of a driver and/or a forestry machine and/or to guiding the driver in connection with use of the forestry machine.

BACKGROUND

During the operation of a forestry machine, measurement data and/or information describing an operational state is available about the operation of a plurality of different components. In particular, control systems of a modern forestry machine that are based on a CAN (Controller Area Network) or another data transfer bus enable in practice a data collection system embracing the entire machine to be implemented even by merely commissioning software and/or a software product. Further, when considered necessary, the forestry machine may be provided with special additional sensors particularly for this purpose.

Conventionally, this measurement data and/or information describing the operational state has been utilized for determining the need for adjustment or service and maintenance, as described in Patent Application FI20055266.

However, the prior art suffers from the drawback and defect that significant factors affecting productivity have been ignored when utilizing such data and information. This may be mainly because the prior art has distinctly focused on monitoring the condition of the machine and on solutions for monitoring a pure technological performance of the machine.

A particular problem is that while it has been possible to provide the driver with even extensive reports and material for processing, interpretation, however, is at least largely or completely left to be carried out by the driver. However, it is a commonly known fact that the driver of a forestry machine is subjected to a heavy information load and other mental stress factors over long uninterrupted periods of time and that it is only seldom that a sufficiently accurate analysis of the material is actually made.

BRIEF DESCRIPTION

An object of the invention is thus to provide a method, and an apparatus, software and a software product implementing the method so as to enable the aforementioned problems to be solved. The object of the invention is achieved by a method and a system which are characterized by what is stated in the independent claims. Preferred embodiments of the invention are disclosed in the dependent claims.

An advantage of the method and system according to the invention is a considerably higher productivity than that provided by the prior art because human factors that affect the productivity are also taken into account. In addition, the method according to the invention is capable of guiding the driver to change his or her manners of operation and/or working routines so that a better end result, such as a lower fuel consumption and/or higher productivity, is achieved. Further, the solutions according to the invention enable the combined operation of the forestry machine and its driver to be monitored in a better way. The machine may also learn and identify the user's needs and be able to adapt e.g. to the driver's state of alertness. When necessary, the machine is capable of identifying a clear error or a disadvantageous action in the user's operation, and the machine may even forcedly control one or more operations if this is considered advantageous as far as the overall use of the machine is concerned.

The invention enables an advanced operation of the machine and its control system to be achieved wherein data describing the driver's operation or the cooperation of the driver and the machine is utilized as a background such that the machine automatically adjusts one or more control parameters so as to enable e.g. a more advantageous fuel economy or a higher productivity to be achieved in forestry machine work.

BRIEF DESCRIPTION OF THE FIGURES

The invention is now described in closer detail in connection with the preferred embodiments and with reference to the accompanying drawings, in which.

DETAILED DESCRIPTION OF THE INVENTION

Figure 1:
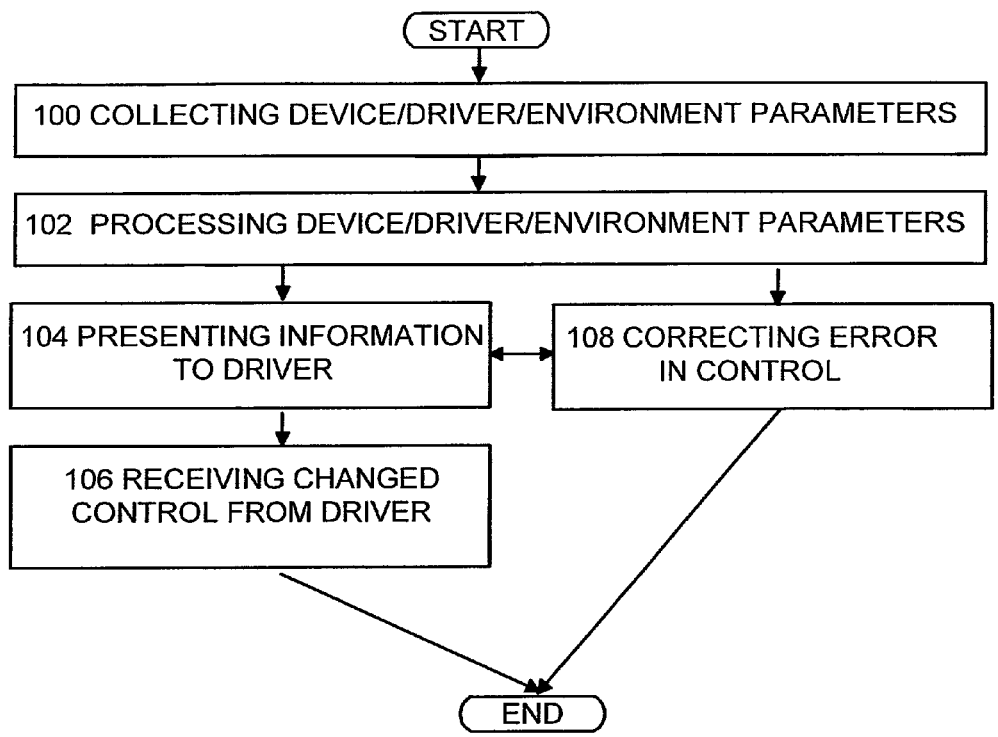
FIG. 1 shows an embodiment of a method.

The embodiments set forth in the following relate to forestry machines. In this context, a forestry machine refers e.g. to a harvester, a forwarder, a logging machine, a feller-buncher, a processor or a combination thereof. Particularly, the solutions according to the present invention are suitable for the case of a grab harvester, wherein the work of its driver involves carrying out numerous accurate movements while trying to meet a high speed requirement and simultaneously monitoring the quality of timber being processed. For instance, controlling a boom, a crane or a loader of a forestry machine requires strict accuracy from the driver and, on the other hand, monitoring the timber quality during harvesting affects critically the economical result of the harvesting as far as both the forest owner and the forest company are concerned. It has thus been found that the work of a forestry machine driver may be quite intense and stressful both psychologically and physiologically, particularly if the working conditions are not appropriate.

A control system of a forestry machine consists of a central control unit and control units connected thereto via a data transfer connection of some type. In the forestry machine, e.g. a CAN, Arcnet or another corresponding bus may be used for transferring real-time or substantially up-to-date information between the control units. Such a bus enables measurement data of various types to be transferred to the central control unit of the forestry machine. It is also possible that the control units included in the control system of the forestry machine and, typically, also physically distributed to different sides of the machine, may be configured to process collectable data locally already before such data is transmitted to be forwarded by the bus. Usually this is appropriate in order to achieve as good realtimeliness as possible and to keep the load of the bus as small as possible. In terms of hardware and software, too, the control units may be particularly equipped to suit their aforementioned tasks as well as possible.

When the driver's operation is to be monitored, a particularly interesting group of parameters consists of data obtained from the driver's control panel and/or joysticks and control commands that are usually conveyed via a man-machine interface. With his or her control operations, the driver may control e.g. the turning, folding, lifting, extension/telescope of a boom or the rotation of a rotator as well as the opening/closing of a grab. In the case of a harvester, the number of commands entered by the driver may further increase significantly when controlling the numerous operations of a harvester head and e.g. entering timber types and preselections, most usually via keyboards, are involved. Information about these control operations may be registered on the control unit of the machine.

Moving/driving a forestry machine in terrain involves various data, some of which is caused by the driver and some, at least indirectly, also by other factors, such as the shapes of the terrain. Control data related to driving and produced by the driver includes e.g. data obtained from front and rear pedals, the direction of travel and speed range of the machine, working brake and frame lock data, frame joint control, and motor rotation speed. Some machines are also provided with sensors, whereby data obtained from the sensors enables e.g. the movement area and position of one or more frames, axles and/or control cabins of the machine to be monitored. Sensors of this type, such as gyroscope and inclinometer sensors as well as various acceleration and position sensors, are often used e.g. in active levelling and stabilizing applications for the control cabin or entire frame of the forestry machine.

Data obtained from the motor may include e.g. torque, temporary fuel consumption, long-term fuel consumption, fuel consumption per power produced, load percentage at the speed used, requested running speed. Further, depending on the equipment provided, other useful and work-related measurement data, such as the weight of a load to be supported by the booms at a given time or located in a cargo space of the machine or various acceleration sensor data, may be obtained from the forestry machine. Particularly the existing small acceleration sensors may be readily arranged even in several different parts of the machine or the boom if the movement area of these parts is to be monitored in closer detail. It is also possible to provide several different operations, such as e.g. all degrees of release of a crane or a loader, e.g. with linear or increment type position sensors. Examples of these operations may include turning, lifting, folding and telescope operations of a crane.

In an embodiment, one or more operations of the machine may be modelled or automatically implemented in connection with service and maintenance work. An example of a modellable operation may be e.g. a harvester head feed function or, alternatively, e.g. use of traction transmission at a certain driving speed and at a known load. It is then possible e.g. during service and maintenance or another support function of the forestry machine to measure the condition or relative performance of the machine by carrying out movements determined by hydraulic operations and by simultaneously measuring as parameters e.g. the pressure from pressure sensors of the harvester and the torque from a diesel motor on a CAN bus. For instance, a flow sensor may be arranged for the duration of the measurement in the hydraulic system in a position reserved therefor, and the flow sensor is connected to the control and data system of the forestry machine for the duration of the operations being carried out. A new machine may also be taught behaviour curves, such as pressure, Nm, Q or mA in the operation in question as a function of a suitable reference quantity. During working, measurement results obtained in practice may be compared with modelled measurement results and draw conclusions whether or not the operation of the machine and/or the driver is in need of correaction.

FIG. 1 shows an embodiment of a method.

In step 100, one or more parameters to be relayed in a control system are measured from a forestry machine. A parameter may be a device parameter whose value may be obtained e.g. from a meter or a sensor analysing the technical operation of the machine. The parameter may, for instance, indicate the pressure of a hydraulic system, driving speed of the machine, temperature in a subsystem, fuel consumption or voltage in a subsystem. The values of the parameters may be conveyed to the control system of the apparatus for collection.

A measurement parameter may also be a driver parameter, such as a control command, which describes a control operation carried out by a driver. Such a control operation may be e.g. one carried out by using a joystick, a keyboard or pedals. The driver parameter may also be a measured parameter obtained separately by using sensors in order to determine the driver's physical condition, such as a heart rate, pulse variation or another corresponding parameter.

Further, a parameter to be measured may be an environment parameter describing the operation environment of the forest machine, such as acceleration or position data, terrain data obtained e.g. by a gyroscope sensor, or sufficiently accurate GPS position data. Preferably, the environment parameter may also be a slope in the terrain in a longitudinal direction with respect to the driving direction of the machine, which may be measured e.g. by utilizing the existing sensors for levelling a crane or a control cabin. The environment parameter may also be measurement or timber type information received from a harvester measurement device and/or the driver. In an embodiment, the environment parameter is a parameter sensed e.g. by laser scanner technology or other non-tactile technology, such as the location, dimension or amount of timber and terrain obstacles around the machine. Further, in relation to the machine, load data provided by loader scales and indicating the weight of the load, such as a bundle of wood, carried by the loader may also be seen as an environment parameter.

In step 102, the parameters collected in step 100 are analysed and processed. Herein, processing refers e.g. to comparing measurement values with preset threshold values, calculating/generating derived quantities, generating information to be presented, drawing conclusions and providing necessary control operations.

In step 104, appropriate information is presented to the driver. The information may be presented to the user e.g. visually, audibly or in another corresponding manner sensorily perceivable by the driver. The information to be presented may include data measured in step 100 and/or information further processed in step 102.

In a method according to an embodiment, it is feasible that the pressure (bar) of the hydraulic system and/or the volume flow (l/min) of the machine have been measured in step 100. The measurement may be carried out, for instance, from electric control to be conveyed through estimation to a hydraulic pump, pressure control valve or system, or measurement results may be taken from pressure sensors arranged e.g. in connection with a hydraulic pump or at another appropriate point in the hydraulic system.

In step 102, the aforementioned hydraulic parameters may be analysed and some further processed information may be generated therefrom. In an embodiment, a product of the pressure produced by the pump and the volume flow of the hydraulic system may be formed as a calculated parameter, the product describing substantially the power supplied by the hydraulic system in question.

Figure 2:
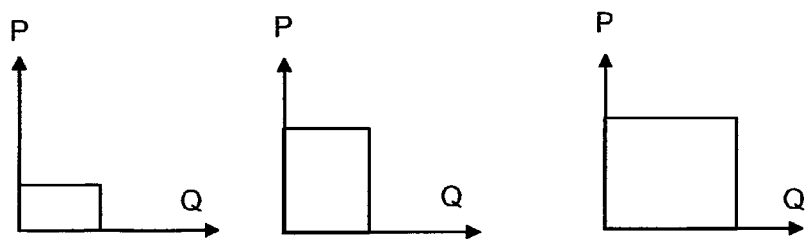
FIG. 2 shows an implementation of a hydraulic meter.

In step 104, the use of hydraulics is presented to the driver. Such a presentation may be carried out e.g. visually through a user interface of the control system of the forestry machine, most usually a display device and an application used in connection therewith. FIG. 2 illustrates one such visual manner of presentation. The figure shows three different use situations on a P-Q coordinate system. The horizontal axis of the coordinate system designates the volume flow Q of a hydraulic fluid (e.g. l/min) while the vertical axis, correspondingly, designates the pressure P of the hydraulic fluid (e.g. bar). A product of a given volume flow describing an operation point in the system and the pressure corresponds with the power necessary for the operation of the hydraulic system at a given time. On the other hand, in the shown coordinate system, the surface area of a rectangle formed by the pressure and volume flow levels is indicative of the load level of the hydraulic system.

In the left-hand side coordinate system, both the pressure and the volume flow are at a relatively low level, in which case the surface area of the rectangle is also small. In addition to the small rectangle, this may be indicated and illustrated to the user by the colour of green, for instance. In the middle coordinate system, the pressure is considerably higher than in the left-hand side coordinate system, in which case the power demand of the hydraulic system is already higher than in the left-hand side graph. In addition to the increased surface area of the rectangle, this may be illustrated to the user by the colour of orange or yellow, for instance. In the right-hand side coordinate system, both the pressure and the volume flow are at a high level and the surface area of the rectangle is somewhat large, which may further be illustrated by colouring the rectangle red, for instance.

As mentioned above, in addition to the graphical presentation similar to that shown in FIG. 2, when necessary, it is possible to indicate to the driver the reason why the hydraulics are at a high level. This is feasible particularly if the control system of the machine is capable of concluding, by analysing the measurements it conducted and the data describing the operation of the machine, that the heavy load of the hydraulics might be caused by an erroneous or unnecessary control operation carried out by the user.

The presentation of step 104 may be performed in several different connections. In an embodiment, information is presented to the driver continuously. In another embodiment, the presentation is carried out when one or more parameters exceed a preset threshold value. In the example of FIG. 2, such a threshold value may consist of a threshold value set for P, a threshold value set for Q, or a threshold value set for the surface area of the rectangle. In an embodiment, the presentation to the driver is carried out only when a relevant work phase is active. Typically, PQ visualization describing the load of a hydraulic system, for instance, is suitable for being presented when using a boom of a forestry machine, since the hydraulic system of the boom is most commonly implemented by a so-called load-sensing (LS) system. The LS system is characterized in that its relative energy efficiency (a ratio of the power used for effective work, such as loading of timber, to the power derived by the hydraulic system from a power source of the forestry machine) declines dramatically if operations to be used simultaneously require pressure levels that are very different from one another. In such a situation, the driver, through the PQ visualisation, is able to detect e.g. that the activation of a single operation that requires only an insignificant volume flow might cause an abrupt increase in the pressure (P) of the LS system to a level that is higher than that required by other operations, which leads to an unnecessarily high power demand. In the prior art solutions, in practice the driver has had no other available way to detect such variations in the load but to monitor a change in the noise made by the power source of the forestry machine, most usually a diesel motor, and a decrease in the rotation speed value. An example of such a situation is that, for some reason, the driver unnecessarily keeps the closing function of a grab of a loader active even if the grab remains closed without continuous activation of the respective button. However, the function in question keeps the LS pressure at a high pressure level even though it only uses very little or no volume flow at all.

The information to be presented may also contain such information presented control-specifically. As an example of the shown use of hydraulics, it may be contemplated that the use of the hydraulic system is presented to the driver such that the proportion of each control operation carried out by the driver of the total use can be seen. It is also possible to indicate to the user if some control operation causes an unnecessarily extensive use of hydraulics.

In method step 106 of FIG. 1, when necessary, a changed control is received from the user, the changed control optimizing the load of a subsystem of the machine, it e.g. decreases the load caused to the hydraulic system. Such a system may also be configured to ensure that no single function is quite so susceptible to taking up the capacity of the hydraulic system at the cost of other functions, as is the case in the prior art solutions. The use of different degrees of release of e.g. a boom or a crane is a good example of this. In other words, it would be desirable that a function starting with a lower pressure but requiring a lot of volume flow does not use unreasonable amounts of the volume flow, which would result in the other functions becoming substantially slower or even stopping completely, irrespective of the driver's control. Other targets to be optimized may be e.g. fuel consumption (temporary/long term), mechanical stress on the machine, noise pollution affecting the driver or the environment of the machine, pollution caused by vibration affecting the driver, motor exhaust gas emissions, service and maintenance work required by the machine, optimization of the driver's work in relation to the driver's experience or state of alertness, or a corresponding quantity.

Thus, method branch 104 to 106 of FIG. 1 is interactive between the machine and the user such that the machine presents information to the driver and waits for the driver to adapt his or her operation on the basis of the information.

FIG. 1 also shows another method branch 108, which may be applied independently or it may have a connection to the above-disclosed method step 104.

If the analysis of the parameters in step 102 indicates that the operation or control of the machine needs to be improved, the erroneous control may be corrected, according to step 108, independently of the user and without any notice to the user. Alternatively, a disadvantageous situation may be identified and presented 104 to the driver, who may be given some time of a given duration to correct the disadvantageous operation. The driver may also be asked for acceptance as to whether the machine is automatically allowed to perform a correcting operation. For instance, pressing harder a control device or a button or offsetting it farther from the rest position may be interpreted as a decision made by the driver to overrule/ignore the automatic/adaptive operation of the machine. In practice, it is possible via the user interface of the control system to configure the adaptiveness of the control system to act as desired e.g. by selecting a low, medium or high system adaptiveness/activity level, in which case the machine and the intervention frequency/activity in the operation of the machine by its control system are as desired. Such settings may be integrated in the driver-specific settings of the control system together with other settings, such as loader adjustments, delays and control ramps, etc., in which case they correspond with the driver's skill and performance level. Similarly, the control system may be adapted e.g. to increase its adaptiveness or activity as a common enough drop in the driver's state of alertness is identified during the course of a work shift, for instance.

When adapted to the above-described hydraulics example, if in step 102 the control system of the machine has detected, on the basis of the measurements of the parameters in step 100, that the hydraulic system of the machine is loaded, the control system may analyse the current operations of the forestry machine and locate and indicate a hardware part or an operation which causes an increase in the hydraulics demand. Such an increased demand may be caused e.g. by an erroneous or unnecessary operation carried out by the user. One such unnecessary operation that unnecessarily uses hydraulics may be e.g. that the driver leaves the grab closing function on even if the grab has already locked to the timber; keeping the function active is not beneficial in any way.

In step 108, the apparatus may directly adapt to the situation and, after detecting that the grab closing is unnecessary, release the function. Naturally, the grab open/closed function may also be implemented by sensors, in which case it is also possible to monitor how the grab remains closed in the case of a large load, for instance. In this connection, it may also be ensured whether or not the user accepts the machine's automatic adaptiveness. The machine may again e.g. visually or by voice information indicate to the user that an adaptive function is being used.

Correspondingly, it is also possible to identify other disadvantageous manners or situations of use wherein owing to the driver's operation e.g. the fuel economy of the machine is brought to disadvantageous operation point. Typically, e.g. in the use of a crane or a loader, a simultaneous use of certain operations at a high speed may lead to the hydraulic system of the forestry machine and, consequently, the power source, most often a diesel motor thereof, becoming subjected to a sudden and large load.

Further, the use of weight information obtained via loader scales, for instance, in controlling the loader or crane of a forwarder or a harvester enables a more accurate loader with a better efficiency. In other words, in the control of the movement of a lightly loaded loader or crane, it is possible to use less extensive control operations in order to achieve the same speed of movement. Similarly, the weight information obtained from the loader scales may also be used e.g. for controlling the pressures of a harvester grab by adjusting a barely sufficient pressing pressure of blades and rollers at a given time in order to achieve as small friction as possible between the timber being processed and the harvester head, simultaneously ensuring that the timber stays firmly in the grab and that the measurement is accurate. From the weight of the timber being processed and the position of a tilting bow, which describes a power reaction caused by feed power, it is possible to conclude the optimal pressing power of the blades and rollers.

Figure 3:
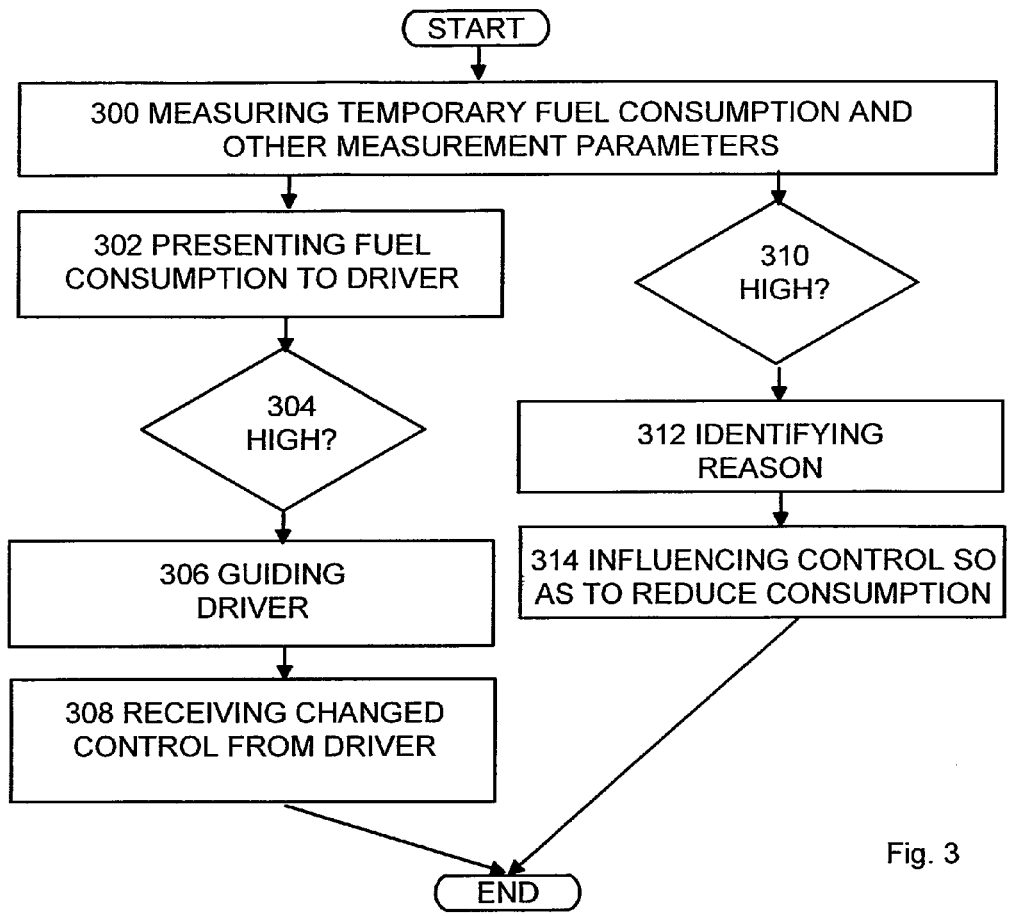
FIG. 3 shows another embodiment of the method.

FIG. 3 shows another embodiment of the method. In the embodiment, the task is to optimize the fuel consumption of the forestry machine during use of the machine.

In step 300, a temporary fuel consumption of the machine is measured. At the same time, other control parameters of the apparatus and other quantities describing the operational state of the machine are measured. By utilizing possible modelling information that has been formed in advance and stored in the control system it is possible to estimate how much each operation executed by the machine influences a given temporary fuel consumption.

Figure 4:
FIG. 4 shows an embodiment of a fuel consumption indicator.

In step 302, the fuel consumption is presented to the user. The presentation may be carried out visually e.g. by a bar diagram according to FIG. 4. The diagram illustrates consumption in three different colours, e.g. green, orange, and red. If the consumption is in the green, the consumption level may be considered normal. When the consumption is in the orange, the consumption is higher than normal and the machine or the operation of the driver may need some correction. When the meter is in the red, the consumption is high and the driver should indeed find correcting operations in order to decrease the consumption e.g. either by changing his or her own operation or by checking the appropriate working condition of the machine. The high consumption may be caused e.g. by failure of one or more functions of the forestry machine, or by decreased performance or, on the other hand, by an unnecessarily high load on the hydraulic system caused by an inexperienced driver with his or her working manners. It is even possible that the solution according to the invention proportions the fuel consumption to be presented at a given time to the work performance being carried out at the time in question. In the case of a harvester in particular, this may be implemented e.g. by comparing a quantity which describes a work performance and which is estimated on the basis of the diameter data and feed rate of the timber being fed through the harvester head with the temporary fuel consumption. Naturally, a corresponding comparison and/or examination may be carried out by employing temporary values; however, most often it is the long-term comparison between output and fuel consumption that gives a more reliable result. In some cases and situations, however, it may be useful that the driver is also provided with information about the temporary values on the basis of which he or she may adjust his or her manners of operation e.g. by thus monitoring an effect that e.g. pressing pressure adjustments made to the harvester head for delimber knifes or feed rollers has on fuel consumption.

If in step 304 it is detected that the consumption is high, the driver may be given a more accurate indication of what might be causing such a high consumption as is shown in step 306. This enables the driver to develop his or her control in accordance with step 308.

As an alternative to such interactive adjustment with the driver, in step 310 the machine may independently detect that the fuel consumption of the machine is high as compared with the work performance carried out. After the control system in step 312 has identified the reason for such a high consumption, one or more control operations may be performed independently in step 314 with no contribution from the driver.

Figure 5:
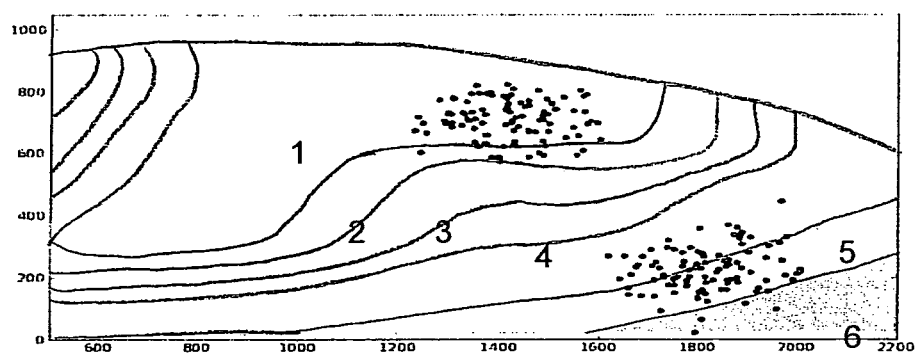
FIG. 5 shows another embodiment of the fuel consumption indicator.

FIG. 5 illustrates a presentation of fuel consumption to be shown to the driver, wherein the x-axis shows the operation speed of the motor while the y-axis shows the torque of the motor. In terms of specific fuel consumption, the figure shows different areas that are numbered such that area 1 represents the lowest consumption and, correspondingly, area 6 represents the highest consumption. Typically, such a graph is always motor-specific and, in the case of modern diesel motors, mainly modifiable to suit each application by modifying a special fuel injection map. In practice, the injection map may be modified by the motor manufacturer within the limits allowed by emission regulations currently in force and the technology of the motor.

The figure shows two sets of points that relate to the consumption history of given work phases. The sets of points relating to different work phases may be designated e.g. in different colours.

The graph may show the consumption of a current work phase as a point which differs from the rest of the set of points, e.g. as a larger or differently coloured point so as to enable the driver to easily distinguish the current operation point from the history data. It is thus easy for the driver to observe whether or not the motor of the forestry machine is running in an advantageous area and/or operation point as far as fuel consumption is concerned. In other words, the driver may e.g. change the working cycles of the motor if, on the basis of the fuel consumption history, the temporary consumption of the machine is e.g. unnecessarily high with respect to the work performance. If necessary, the machine may also guide the user to find the reason for such a high consumption. On the other hand, it is also feasible that the power source of the forestry machine is provided with several different injection maps adapted particularly for certain work situations, or that one injection map that is used may adapt to the use situation when certain conditions are met. In other words, e.g. during sawing or feeding, an injection map may be used that is better than usually capable of responding to a large, stepwise load or another corresponding set of parameters characteristic of motor control.

Figure 6:
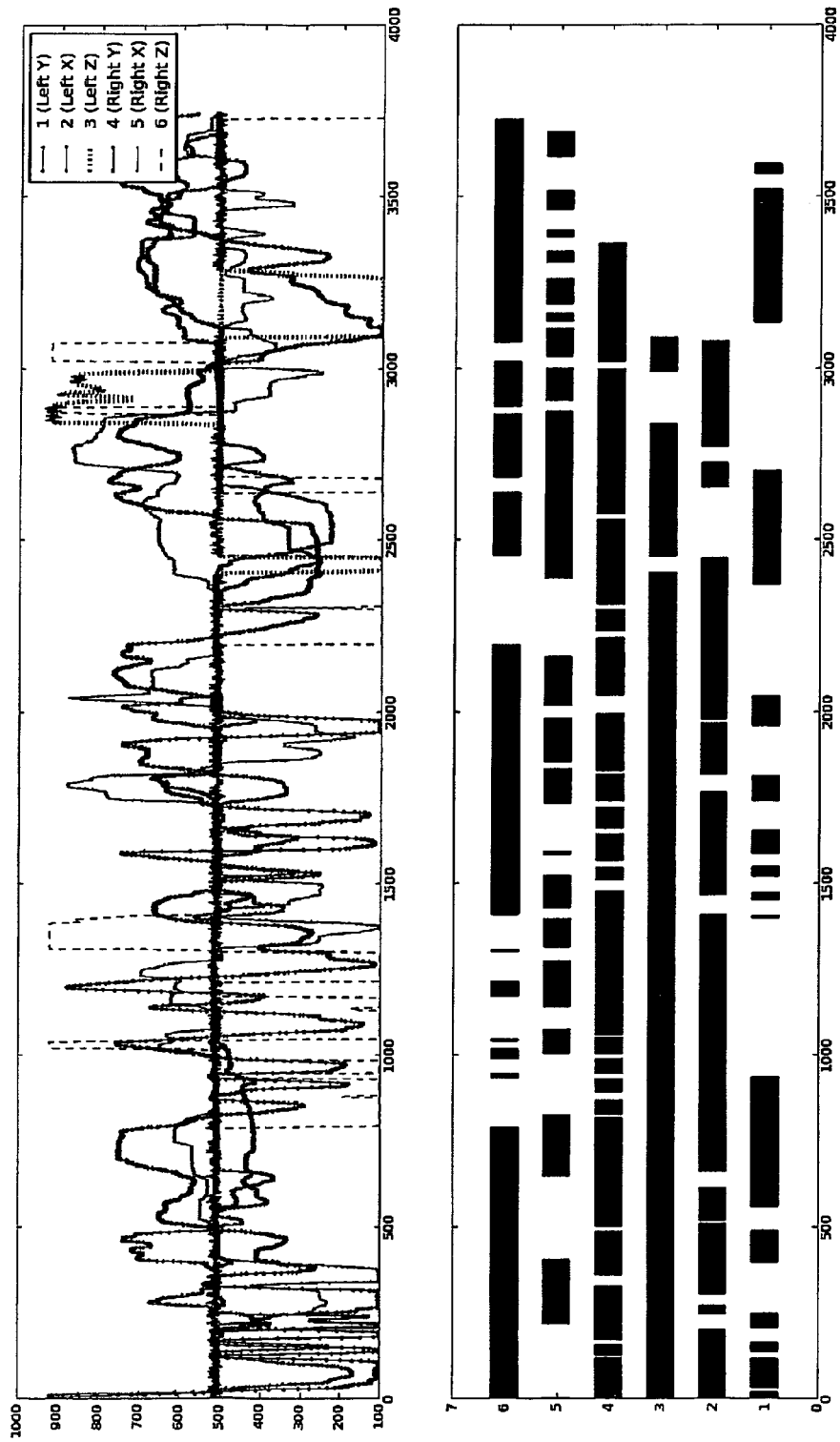
FIG. 6 shows an embodiment of a presentation manner of a use of controllers.

FIG. 6 illustrates the driver's capability to use several functions of the machine, such as the release degrees of a crane or a loader, simultaneously. Basically it may be assumed that the more functions the driver uses simultaneously while working, the higher the productivity of the work. In other words, a less experienced driver may only be capable of using one or two of the numerous functions of e.g. a crane or a loader simultaneously. In such a case, the working process and the movements of the boom look rough and slightly clumsy. On the other hand, an advanced and experienced driver is capable of using the crane or booms efficiently, several simultaneous movements at the same time even at a high speed. The working process also looks smooth and stable and is often energy-saving, too.

The upper section in FIG. 6 shows measurement signal data from different controllers as a function of time. The lower section of the figure defines which controller is used at which moment in time. As can be seen in the example of the figure, in this case the driver uses at most five functions at a time.

The information of FIG. 6 may be utilized automatically in the machine in order to determine the driver's level of experience and, thereby, to adapt the operation of the machine such that it is optimal with respect to the level of experience. If, for instance, it is detected that the driver uses only one or two controllers at a time, it may be concluded that the particular driver is relatively inexperienced. In such a case, it is possible to add some delay or ramps to the controllers, thus bringing some smoothness and flexibility to the use of the machine even in the hands of such an inexperienced user. If, again, it is detected that the driver is an experienced one, the delays of the controls may even be removed completely when necessary; this often enables maximum speeds of movement and a high productivity but, on the other hand, sets higher requirements for the driver of the machine.

Figure 7:
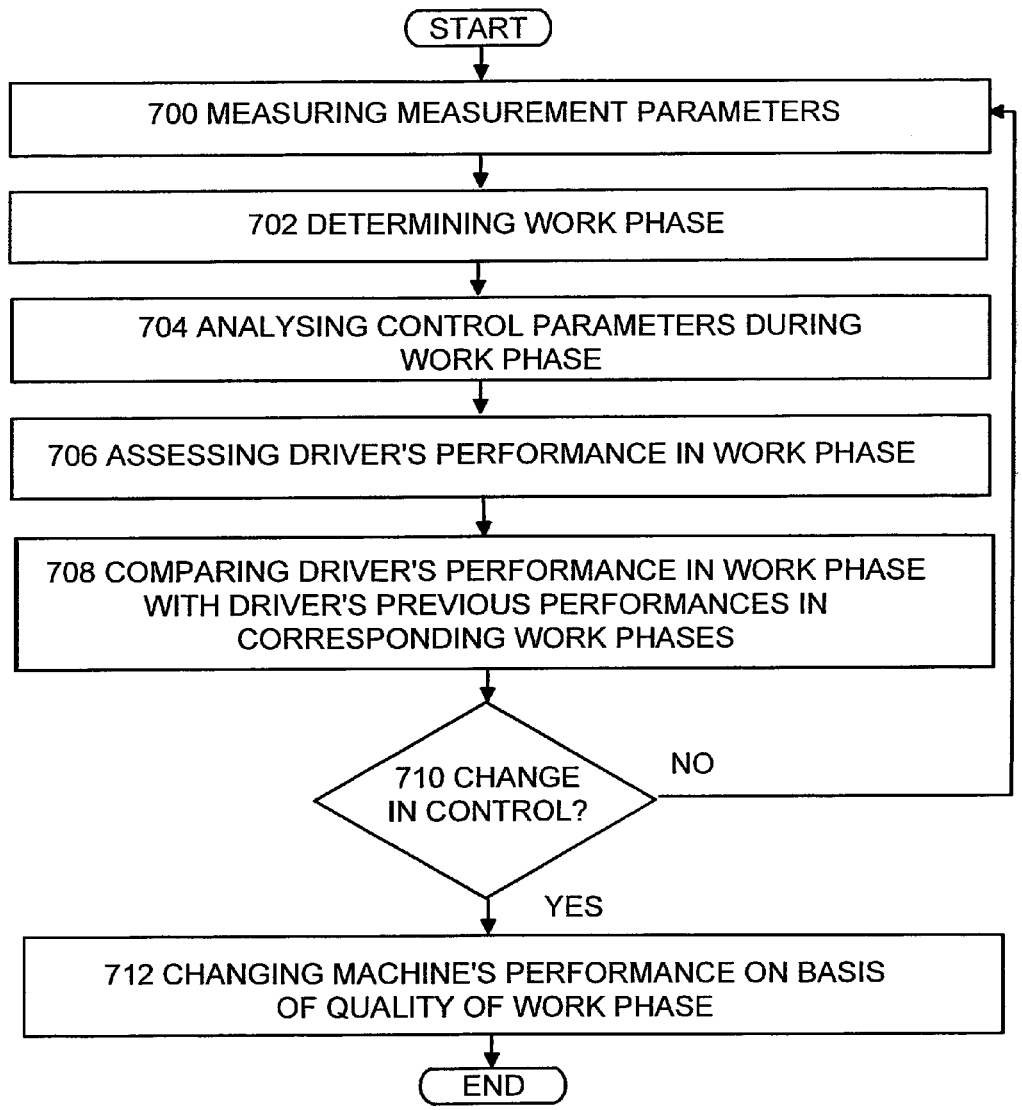
FIG. 7 shows yet another embodiment of the method.

FIG. 7 shows an embodiment of the method. In step 700 of the method, measurement parameters are measured. In step 702, the measurement parameters are analysed, and e.g. on the basis of functions of a machine and a boom, such as turn, lift, telescope, and sawing, a control unit may conclude that the function is question is a sawing function. The sawing function may be determined to be e.g. a time period between the end of feeding a tree trunk and the end moment of sawing.

In an embodiment, data describing the operation and/or state and/or environment of the forestry machine or its driver, and on the basis of this data, a currently ongoing work phase or work performance is identified. After the work phase or performance has been identified, this data may be utilized when information, feedback, guidance or other data concerning particularly the ongoing work phase or performance is to be presented to the driver. The identification of a work phase may be carried out e.g. by comparing the measurement results with standards describing the work phase.

In step 704, the control parameters from the time during the work phase are collected for analysis. The control parameters may be read from memory wherein they were collected during the work phase.

In step 706, the performance of the driver is assessed on the basis of the data collected during the work phase. In an embodiment, the driver's performance is assessed by means of time meters. For instance, the time spent on an entire work phase may be calculated, or the work phase may be divided into several sub-phases, such as turning a boom or sawing, and estimate the time spent on executing these sub-phases.

In step 706, the driver's performance may also be assessed in relation to a particular model performance stored in the control system. The model performance may determine e.g. certain time limits as to when each sub-work-phase in a sawing function phase is optimally carried out. The model performance may also determine e.g. as to how high felled timber is lifted and whether or not the boom system telescope function is used in a given situation.

In step 708, the driver's performance is compared with corresponding work phases that have previously been carried out by the driver. The comparison may be carried out either with work phases associated with the driver's current work shift or with a work history taken from a longer period of time. Similarly, the driver's performance may also be compared with other drivers or particularly with model performances that are known to be highly experienced and skilful.

In step 710, it is determined whether or not the driver's work performance deviated somehow with respect to the driver's ordinary or desired performance. If yes, the process moves to step 712, wherein the performance of the machine is changed to correspond with the driver's current performance. If in step 710 it is detected that, although exceeding a given threshold condition, the driver's working takes place slower than normally, the control operations of the machine are delayed so as to correspond with the driver's performance level.

In yet another embodiment, the fuel consumption of the machine is estimated by means of the speed of rotation and torque of the motor. For instance, a graph may be provided in a coordinate system wherein the x-axis indicates the speed of rotation while the y-axis indicates the torque. The coordinate system may show the fuel consumption in a colour which depends on the level of consumption.

The graph may show the driver e.g. the historical consumption and the temporary consumption. The driver may thus see in the graph how the current consumption, at the current speed of rotation and torque, proportionally relates to the historical data. If, for example, the driver sees that the temporary consumption is higher than what has previously been with the corresponding motor function parameters, the driver may try to correct his or her operation towards a lower consumption. Alternatively, the forestry machine may conclude the reason for the high consumption and indicate it to the user. Further, alternatively, the machine may conclude the reason and at least to some extent apply force control, ignoring the driver's control.

In an embodiment, the type of a site is concluded e.g. from the driver's control data and/or motor and harvester head measurement data. For instance, it may be concluded whether the site in question is a clear felling or a thinning site. On the basis of the site type, it is possible to optimize the operation parameters of the machine and/or the parameters affecting the driver's control. In a thinning site, for instance, it is possible to measure from the driver's joystick movements how dense the site is. The obtained data enables the feed rate of the harvester head to be adjusted such that in dense thinning it may e.g. be lowered, thus avoiding unnecessary damage to standing timber, whereby the function significantly alleviates the driver's work.

In yet still another embodiment, the use of different functions of a loader or a crane is measured. The mutual usage times of articulations may be examined and compared with one another and utilize the obtained data for developing the driver's driving manners. For instance as far as energy economy is concerned, it may be justified to prioritize the use of a given function even if the same work performance could be carried out by using two or more different paths. Typically e.g. in the case of a so-called path crane, it may be advantageous to try to perform the movement of a boom end away from and towards the machine by using a so-called transfer cylinder rather than a telescope cylinder. On the other hand, with so-called sliding boom type cranes, the use of a telescope is the primary way to achieve the aforementioned path of moving the boom end away from and towards the machine.

Figure 8:
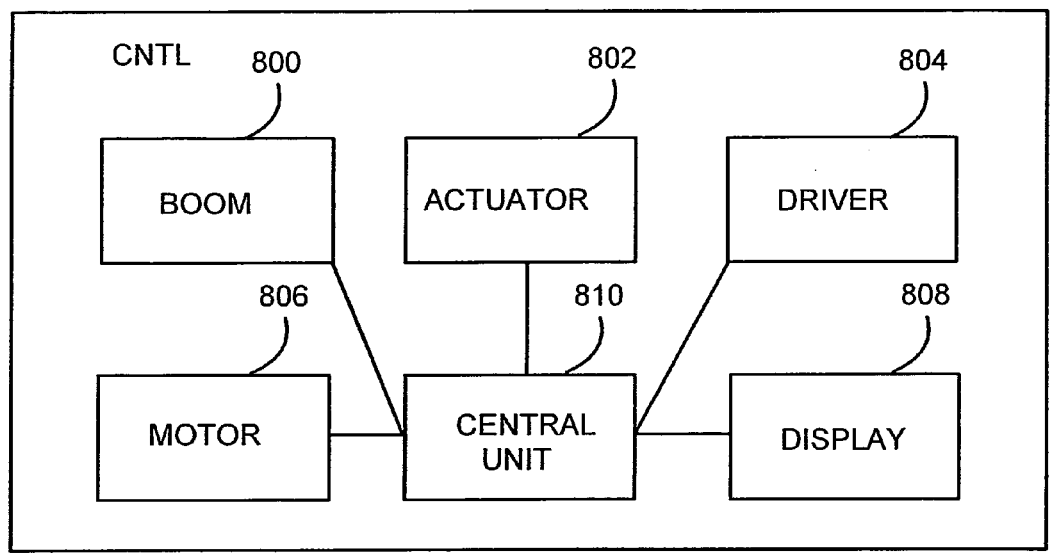
FIG. 8 shows an embodiment of an apparatus arrangement.

Although above the embodiments have been shown in different figures, it is clear that they may also be used in combination. For example, the PQ measurement describing the use of hydraulics may be used together with a meter describing fuel consumption. Meters describing fuel consumption may also be used together in combination with one another, or fuel consumption may be combined e.g. with the measurement of FIG. 6 assessing the driver's experience. FIG. 8 shows an embodiment of a control arrangement of a forestry machine. As far as the control arrangement is concerned, a central part is a central unit 810 which coordinates the operation of the forestry machine, as well as receives and transmits information to other subsystems 800 to 808 of the control system.

A boom system 800, an actuator system 802, a driver system 804, a motor system 806, and a display 808 may be identified as subsystems. The different subsystems may be connected to the central unit 810 and, when necessary, to one another, e.g. by means of a CAN data transfer bus. The functionality according to the invention may be implemented in the control arrangement by a general-purpose computer by software and/or hardware. The functionality may be implemented in the subsystems by software and/or by various measuring devices.

The boom system 800 is responsible for controlling the boom and collecting data relating to the operation of the boom. Correspondingly, the actuator system 802 is responsible for the tasks in question as far as an actuator, e.g. a harvester and/or a grab, is concerned. The driver system 804 receives control operations from the driver. They may include control operations given by the driver through the pedals, joystick, keyboard or the like. The motor system 806 controls the power source of the machine, most usually a diesel motor, on the basis of the control operations given by the driver, as well as receives measurement information from the motor. The measurement information may e.g. comprise fuel consumption information. The display 808 enables measurement information received from different parts and/or information further processed in the central unit to be shown to the driver.

Figure 9:
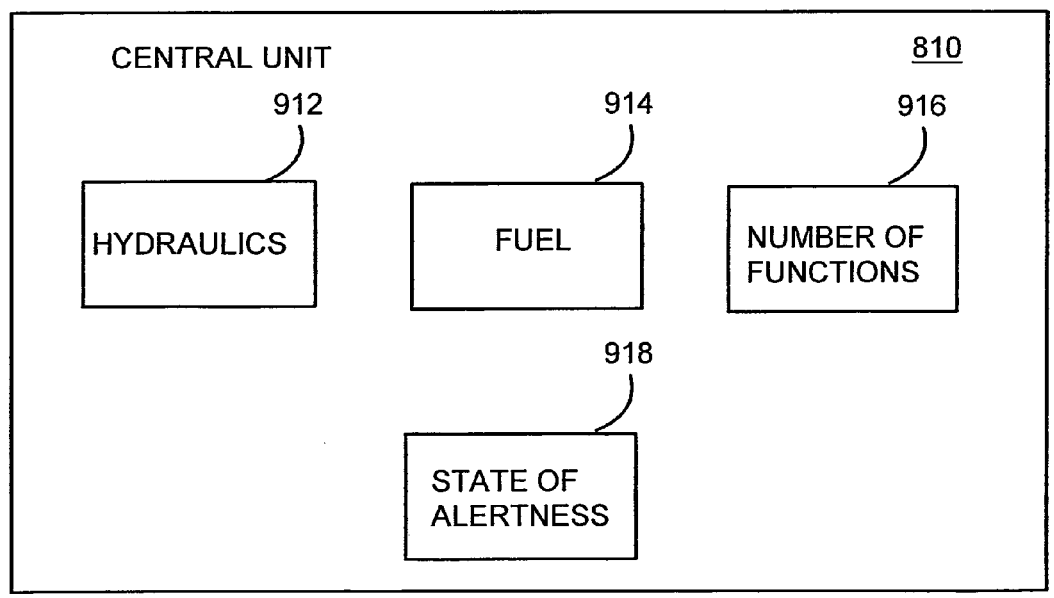
FIG. 9 specifies the embodiment of the apparatus arrangement.

FIG. 9 illustrates subsystems of the central unit 808 shown in FIG. 8 in the light of some embodiments.

The central unit 810 may comprise a hydraulics subsystem 912. The hydraulics sub-system takes as input e.g. a current pressure of the hydraulics system from a point that has been selected to be appropriate, and hydraulics oil from a desired point of the volume flow. On the basis of these, it is possible to generate a graph wherein sides of a rectangle are formed by the pressure and the volume flow. Further, the subsystem 912 may select the colour of the rectangle on the basis of how large the surface area of the rectangle is. If the surface area does not exceed a first threshold value, the colour to be selected is green. If the surface area is between the first and a second threshold value, the colour to be selected is orange, and if the surface area is larger than the second threshold value, the colour to be selected is red. The formed rectangle may be presented to the driver of the machine on the display 808. In another embodiment, the subsystem, after detecting a high hydraulics level and after locating the reason for it, may influence the control of the apparatus. If, for instance, it is detected that the grab of the machine is unnecessarily being pressed together, thus loading the hydraulics system, the subsystem 912 may generate a control signal to the actuator system 802 for releasing the compression of the grab.

The central unit 810 may also comprise a fuel subsystem 914. The subsystem may receive a temporary fuel consumption and generate e.g. a bar diagram therefrom to be shown to the user. In addition to visual presentation, the presentation information may include e.g. a warning voice signal if the consumption level is too high. The subsystem 914 may also determine the reason for such a high fuel consumption, such as an unnecessarily high load on hydraulics. When necessary, a control signal may be generated to be transmitted to one of the control systems 800, 802, 806 for calculating the fuel consumption without the driver's control.

A subsystem 916 may monitor the control signals received from the user, and calculate the simultaneous number of control signals as a function of time. The number may be utilized in the control such that if the simultaneous number of control signals in some detectable work phase does not exceed a preset threshold value, the driver may be considered to be inexperienced, in which case the delay in the control operations may be adjusted to correspond with the driver's professional level.

An alertness state subsystem 918 may determine work-phase-specifically the driver's performance. In an identified work phase, it is possible for instance to determine the time taken by a boom to turn, which value may be compared with the driver's previous performances in connection with the same operation. On the other hand, situations wherein a clear reaction time and an increase in that time e.g. as the driver's work shift advances may be detected may serve as indirect indicators of the state of alertness. An example of this might be the time elapsed from a voice signal given by a measuring device of a harvester to indicate that the feed has stopped at a cut-off window to the moment at which the driver reacts to the information and activates the control button controlling a cut-off saw. If the time the operation took is longer than it usually is, it may be assessed that the driver's state of alertness has deteriorated. In such a case, a control signal may be generated to be transmitted to the driver subsystem 804 in order to increase the control delays of the loader or the crane, for instance.

In the following, further embodiments are described by way of a summary.

The method and the apparatus relate to forestry machines, such as harvesters or forwarders. The method comprises measuring a parameter describing the operation and/or state and/or environment of the forestry machine. The parameters may be measured by actuators, such as a boom and a harvester, or in a motor or form the environment of the machine or from control operations carried out by the driver, and they may be collected in a control unit, for example. Parameter values may also be collected by the actuators themselves.

The method comprises processing the collected measurement data and enabling generation of derived quantities, graphs or warnings to be presented to the user or control operations for ignoring the driver's control or for adapting the apparatus to the driver's operation.

The method enables one or more control parameters controlling the operation of the machine to be influenced and/or the driver to be given feedback, an instruction or a prompt to change his or her control. A control parameter may be e.g. control information given by the driver, or a control signal to be transmitted to a motor or an actuator.

In different situations, the control system of the forestry machine may e.g. via and through a user interface present or convey information to the driver e.g. in the form of one or more of the following: feedback, instruction or prompt.

Typically, feedback may be e.g. an assessment formed by the control system as to whether the driver has succeeded or how well the driver has succeeded in a given work phase or work performance carried out with the forestry machine. Most usually, the formation of feedback comprises at least a phase of comparing an executed work phase or performance with e.g. a preset model performance or standards describing a desirable, successful performance, for instance.

Typically, an instruction may be information or presentation which relates to how the driver, while using the machine, might achieve e.g. a better productivity or maintain the same productivity but at a lower fuel consumption and which is conveyed to the driver by the control system of the forestry machine. The instruction may also be general information about any regularity in the operation of the machine, such as the hydraulic system; taking such regularity into account may play an important role in the execution of as successful a work performance as possible.

A prompt may mean a more detailed instruction or piece of information in particular given to the driver by the control system of the forestry machine, on the basis of which an operation is suggested to the driver who, by executing the operation, may e.g. influence positively the work phase or performance being carried out. The prompt is thus a suggestion which has been developed further and directed at a given task and which is easy for the driver to accept or not to accept also during a hectic and concentration-demanding working session such that the driver's work remains substantially uninterrupted.

In an embodiment, parameters of interest are measured over a short or a long period of time and/or with averaging and/or filtering. A short-term measurement may aim at determining e.g. a temporary fuel consumption or a temporary hydraulic power. A long-term measurement may aim at determining control data over the duration of a work phase. Possibly, the entire work shift performed by the driver may be measured, and work phases within the shift may be compared with one another. Averaging means that the driver's control operations may e.g. be averaged for the duration of a work shift or e.g. a week, and produce an average model for the driver's work performance in a given work phase, for example. Filtering means that from the measured data it is possible to filter out any elements external to the current control operation in order to be able to compare the control operations with one another. For instance, any influence of a slope in the terrain on power consumption may be filtered out if the purpose is to know the hydraulic consumption of a loading task.

In an embodiment, the parameters to be measured include control parameters that present control operations carried out by the driver. These control operations may be e.g. manual control operations carried out by using a joystick or a keyboard or voice control operations or control operations carried out by using pedals.

In an embodiment, the quality of the control operations is measured.

The quality of the control operations may be assessed e.g. by comparing the control performance (temporary or work-phase-specific) with a predetermined model performance. The predetermined model performance may preferably be stored in the memory/database of the control system of the forestry machine.

The quality of the control operations may also be assessed by assessing the flexibility or smoothness of the driver's control operations. It is also possible to monitor the control operations and identify an abrupt change made by the driver in the direction e.g. in connection with some boom control movement, such as a turning movement. The quality may also be provided with specific criteria e.g. such that if the number of operations that could be considered as erroneous control operations is three within five minutes, it may be established that the quality of the driver's work has deteriorated.

If it is established that the quality of control has changed, e.g. deteriorated, the control of the forestry machine is influenced by adapting one or more of the control operations of the machine to correspond with the quality of the control operations carried out by the driver. This may mean that the delay of control operations is increased, for instance.

In an embodiment, the control of the forestry machine is influenced by forcedly controlling the machine in regard to one or more control operations contrary to the control operations carried out by the driver if the quality does not meet a predetermined criterion. It is e.g. possible that if the machine detects a disadvantageous operation, the machine informs the user of this, and the user may accept the force control of the machine or ignore it. Alternatively, the machine does not inform the driver of its intention of forcedly controlling an operation.

In an embodiment, the driver's state of alertness is assessed by comparing the value of measured one or more control parameters with the control operations previously carried out by the driver, and the control of the forestry machine is influenced by adapting one or more control operations of the machine to correspond with the driver's state of alertness. The state of alertness may be analysed for a longer period of time, e.g. for the duration of a work shift. During work shift, work phases may be identified, and if the driver's operations in mutually corresponding work phases start to differ from one another, a change in the driver's state of alertness may be established.

In an embodiment, the driver's state of alertness is assessed by employing physiological measurements to be carried out directly from the driver. For instance, the pulse frequency, pulse variation, skin's electrical conductivity or another physiological parameter may be measured when necessary e.g. by sensors provided particularly for the purpose e.g. in connection with the user interface, such as arm rests and joysticks, of the forestry machine.

In an embodiment, the value of one or more measurement parameters and/or a derived quantity generated therefrom is presented to the driver visually and/or as voice information or in another manner. The visual presentation may be carried out on a display of the driver's computer e.g. by using a bar or a sector graph. The presentation may illustrate the driver's temporary performance in relation e.g. to the driver's own history data, history data collected from a plurality of drivers or a model performance. The advantageousness of an operation may be illustrated by colours e.g. such that when the operation is optimal, the graph is green or orange while in a disadvantageous situation it is red.

In an embodiment, a work phase to be carried out by the forestry machine is determined on the basis of the measured one or more parameters, and the driver's performance is assessed work-phase-specifically.

In an embodiment, the one or more parameters to be measured comprise one or more hydraulics parameter describing the use of the hydraulics of the forestry machine. The parameter describing the hydraulics use may be the hydraulics pressure and/or volume flow. These enable a derived quantity describing the hydraulic power to be generated by multiplying the measurement quantities with one another. Visually this may be illustrated by means of the surface area of the graph to be generated.

If the use of hydraulics is at a high level, this may be indicated through colour, for instance. The driver may also be shown the reason why, i.e. owing to which control operation, the power demand is high. The control system may suggest correcting operations to the user or it may employ force control, ignoring the driver's control.

In an embodiment, the one or more parameters to be measured comprise the temporary fuel consumption of the forestry machine. In accordance with this, it is possible to determine the fuel consumption of the forestry machine in the work phase and present the fuel consumption to the driver, proportioned to the fuel consumption in previous corresponding work phases carried out by the driver and/or in the model performance for the work phase.

In an embodiment, the magnitude of a given load of the forestry machine is monitored e.g. on the basis of the mass indicated by scales or load information entered by the driver, and one or more control parameters of the forestry machine are influenced on the basis of this. This may be e.g. utilized such that if the machine detects a heavy load in a loader or in a cargo space of the machine, it may adapt the speed of rotation and the torque of the machine to be higher than usually. At a small load, the speed or rotation may possibly be lowered in order to save fuel.

In an embodiment, the environment of the forestry machine is measured. For instance, the environment may be measured for a slope in the terrain, i.e. uphill or downhill, and change the traction transmission parameters to meet the requirements set by the uphill or downhill slopes. GPS data combined with terrain shape information (three dimensional GPS data) enable the machine adjustments, such as power, to be directly adjusted on the basis of a GPS signal. The environment may be further observed such that if in a backward time window, e.g. 15 minutes, a large amount of small timber has been collected by means of a crane and a harvester head, it may be concluded that the action in question is thinning. In such a case, the operation of the machine may be adapted to the circumstances e.g. by lowering the feed rate, thus mitigating damages and disfigurements typically caused by too high a feed rate to the standing timber in a dense forest being thinned.

In an embodiment, information is presented to the driver only when a work phase is active. For example, information describing the power demand of the functions of a harvester head is presented only when the harvester head is feeding or sawing a tree trunk being processed.

In an embodiment, the information is presented to the driver only when a value to be measured exceeds a determined threshold value. For instance, if the fuel consumption or use of hydraulics exceeds the threshold value, this is presented to the driver. In an embodiment, the system offers the driver an opportunity to select to be given a more detailed presentation of the matter in question. For example, the driver may be offered a presentation indicating how much each control operation takes up of the temporary hydraulics demand. An unreasonably consuming operation may be highlighted in some visual manner.

In an embodiment, the magnitude of the power taken by the hydraulic system of the forestry machine is estimated on the basis of the driver's control operations. This means that the measurement information is obtained from the control system in the same way that the control is transmitted to an actuator. According to another embodiment, the magnitude of the power taken by the hydraulic system of the forestry machine is estimated on the basis of the driver's control operations and on the basis of measurements adapted to the purpose in particular.

In an embodiment, unnecessary control carried out by the driver is identified, such as continuously driving some movement to an end, which causes an unnecessary power demand e.g. by keeping the pressure of the hydraulic system unnecessarily high with respect to the rest of the operation. The driver may be informed of a disadvantageous manner of operation or the system may adapt the operation of the machine to be more optimal, ignoring the driver.

A functionality described in different embodiments may be implemented as a computer program product which codes a computer program containing commands for executing a computer process according to the aforementioned embodiments of the method. The computer program product may be implemented on a computer-readable storage medium. The storage medium may be any known software storage medium, computer-readable separate memory medium, computer-readable software distribution package or computer-readable packed software package.

It is apparent to those skilled in the art that as technology advances, the basic idea of the invention may be implemented in many different ways. The invention and its embodiments are thus not restricted to the above-described examples but may vary within the scope of the claims.

The invention claimed is:

1. A method in connection with working with a forestry machine, wherein the method comprises the following steps:
   collecting in a control unit of the forestry machine, data describing operation of the forestry machine, said data comprising one or more parameters comprising at least a measured temporary fuel consumption related to specific work task or to operation at a logging site, and a parameter describing an operational state of the forestry machine;
   processing in the control unit of the forestry machine, the collected data to detect high fuel consumption related to specific work task or to operation at the logging site;
   influencing, on the basis of the processed data, one or more parameters controlling the operation of the forestry machine, the operation of the forestry machine being implemented by a hydraulic system of the forestry machine, so as to reach a lower fuel consumption and/or higher productivity.

2. The method as claimed in claim 1, wherein the method further comprises:
   assessing, on the basis of the collected data, quality of control operations carried out by the driver of the forestry machine;
   influencing the one or more parameters controlling the operation of the forestry machine to correspond with the quality of the control operations carried out by the driver.

3. The method as claimed in claim 1, wherein the method further comprises:
   assessing, on the basis of the collected data, the quality of the control operations carried out by the driver of the forestry machine;
   offering the driver automatic adaptation of the control operations in order to improve the quality;
   adapting the driver's control operations if the driver accepts the automatic adaptation of control.

4. The method as claimed in claim 1, wherein the method further comprises:
   assessing, on the basis of the collected data, the quality of the control operations carried out by the driver of the forest machine;
   influencing the control of the forest machine by forcedly controlling the machine in regard to one or more control operations contrary to the control operations carried out by the driver if the quality does not meet a predetermined criterion.

5. The method as claimed in claim 1, wherein the method further comprises:
   assessing the driver's state of alertness by comparing a value of one or more parameters with previous values of the parameters;
   influencing the one or more control parameters controlling the operation of the forest machine to correspond with the driver's state of alertness.

6. The method as claimed in claim 1, wherein the method further comprises:
   identifying a work phase or a work performance currently being carried out on the basis of the collected data describing the operation and/or the state and/or the environment of the forestry machine or its driver; and
   presenting or conveying to the driver information, feedback or guidance and/or other data concerning particularly the work phase or performance in question.

7. The method as claimed in claim 1, wherein collecting data describing operation and/or a state and/or an environment of the forestry machine comprises measuring temporary fuel consumption of the machine;
   wherein processing the collected data comprises identifying a reason for high fuel consumption,
   wherein influencing, on the basis of the processed data, one or more parameters controlling the operation of the forestry machine comprises influencing said parameters to reduce fuel consumption, and
   wherein conveying feedback or an instruction or a prompt to a driver to change his or her control comprises guiding the driver so that a lower fuel consumption or higher productivity is achieved.

8. The method as claimed in claim 1, wherein conveying feedback to the driver comprises presenting fuel consumption visually to the driver.

9. The method as claimed in claim 1, wherein the data including data describing operation and/or a state of the forestry machine and data describing an environment of the forestry machine.

10. The method as claimed in claim 1, wherein the step of processing in the control unit of the forestry machine, the collected data to detect high fuel consumption related to specific work task or to operation at the logging site further comprises the steps of
    analysing current operations of the forestry machine, and
    locating and indicating a hardware part or an operation which causes an increase in hydraulic demand.

11. The method as claimed in claim 1, wherein the method further comprises:
    presenting to the driver a value of one or more parameters and/or a derived quantity generated therefrom.

12. The method as claimed in claim 11, wherein the method further comprises:
    presenting to the driver an estimation of optimality of the operation of the forestry machine and/or the control carried out by the driver.

13. A computer program product, comprising computer program code instructions stored on a non-transitory computer-readable storage medium, wherein when the computer program product is run on a computer, the computer program code instructions are configured to execute the steps of:
    collecting in a control unit of the forestry machine, data describing operation and/or a state and/or an environment of the forestry machine, said data comprising one or more parameters comprising at least a measured temporary fuel consumption related to specific work task or to operation at a logging site, and a parameter describing an operational state of the forestry machine;
    processing in the control unit of the forestry machine, the collected data to detect high fuel consumption related to specific work task or to operation at the logging site;
    influencing, on the basis of the processed data, one or more parameters controlling the operation of the forestry machine, the operation of the forestry machine being implemented by a hydraulic system of the forestry machine, so as to reach a lower fuel consumption and/or higher productivity.

14. An apparatus, wherein the apparatus comprises
    a control unit of a forestry machine configured to
        collect data measured from operation and/or a state of a forestry machine and/or describing an environment thereof, said data comprising one or more parameters comprising at least one measured temporary fuel consumption related to specific work task or to operation at a logging site, and a parameter describing an operational state of the forestry machine; and process the collected data to detect high fuel consumption related to specific work task or to operation at the logging site; and means for influencing, on the basis of the processed data, one or more parameters controlling the operation of the forestry machine, the operation of the forestry machine being implemented by a hydraulic system of the forestry machine, so as to reach a lower fuel consumption and/or higher productivity.

15. The apparatus as claimed in claim 14, wherein the apparatus comprises:
    means for assessing the driver's state of alertness by comparing a value of one or more parameters with previous values of the parameters; and
    means for influencing the one or more control parameters controlling the operation of the forest machine to correspond with the driver's state of alertness.

16. The apparatus as claimed in claim 14, wherein the apparatus comprises:
    means for identifying a work phase or a work performance currently being carried out on the basis of the collected data describing the operation and/or the state and/or the environment of the forestry machine or its driver; and
    means for presenting or conveying to the driver information, feedback or guidance and/or other data concerning particularly the work phase or performance in question.

17. The apparatus as claimed in claim 14, wherein the apparatus comprises:
    means for presenting to the driver a value of one or more measurement parameters and/or a derived quantity generated therefrom; and
    means for presenting to the driver an estimation of optimality of the operation of the forestry machine and/or the control carried out by the driver.

18. The apparatus as claimed in claim 14, wherein said collected data includes temporary fuel consumption of the machine,
    wherein the control unit is configured to identify a reason for high fuel consumption,
    wherein said means for influencing is configured to influence said parameters to reduce fuel consumption, and
    wherein said means for conveying feedback or an instruction or a prompt to a driver to change his or her control is configured to guide the driver so that a lower fuel consumption or higher productivity is achieved.

19. The apparatus as claimed in claim 14, wherein the means for conveying feedback to the driver comprises means for presenting fuel consumption visually to the driver.

20. The apparatus as claimed in claim 14, wherein the apparatus comprises:
    means for assessing, on the basis of the measured parameters, quality of control operations carried out by the driver of the forestry machine; and
    means for influencing the one or more parameters controlling the operation of the forestry machine to correspond with the quality of the control operations carried out by the driver.

21. The apparatus as claimed in claim 20, wherein the apparatus comprises:
    means for identifying a work phase or a work performance currently being carried out on the basis of the collected data describing the operation and/or the state and/or the environment of the forestry machine or its driver; and
    means for presenting or conveying to the driver information, feedback or guidance and/or other data concerning particularly the work phase or performance in question.

22. The apparatus as claimed in claim 14, wherein the apparatus comprises:
    means for assessing, on the basis of the measured parameters, the quality of the control operations carried out by the driver of the forestry machine;
    means for offering the driver automatic adaptation of the control operations in order to improve the quality;
    means for adapting the driver's control operations if the driver accepts the automatic adaptation of control.

23. The apparatus as claimed in claim 22, wherein the apparatus comprises:
    means for identifying a work phase or a work performance currently being carried out on the basis of the collected data describing the operation and/or the state and/or the environment of the forestry machine or its driver; and
    means for presenting or conveying to the driver information, feedback or guidance and/or other data concerning particularly the work phase or performance in question.

24. The apparatus as claimed in claim 14, wherein the apparatus comprises:
    means for assessing, on the basis of the measured control parameters, the quality of the control operations carried out by the driver of the forest machine; and
    means for influencing the control of the forest machine by forcedly controlling the machine in regard to one or more control operations contrary to the control operations carried out by the driver if the quality does not meet a predetermined criterion.

25. The apparatus as claimed in claim 24, wherein the apparatus comprises:
    means for identifying a work phase or a work performance currently being carried out on the basis of the collected data describing the operation and/or the state and/or the environment of the forestry machine or its driver; and
    means for presenting or conveying to the driver information, feedback or guidance and/or other data concerning particularly the work phase or performance in question.

26. A forestry machine, wherein the forestry machine comprises an apparatus according to claim 14.

27. A method in connection with working with a forestry machine, wherein the method comprises the following steps:
    collecting in a control unit of the forestry machine, data describing operation and/or a state and/or an environment of the forestry machine, said data comprising one or more parameters comprising at least a measured temporary fuel consumption related to specific work task or to operation at a logging site, and a parameter describing an operational state of the forestry machine;
    processing in the control unit of the forestry machine, the collected data to detect high fuel consumption related to specific work task or to operation at the logging site;
    influencing, on the basis of the processed data, one or more parameters controlling the operation of the forestry machine, the operation of the forestry machine being implemented by a hydraulic system of the forestry machine, so as to reach a lower fuel consumption and/or higher productivity.

28. A method in connection with working with a forestry machine, wherein the method comprises the following steps:
    collecting in a control unit of the forestry machine, data describing operation and/or a state and/or an environment of the forestry machine, said data comprising one or more parameters comprising at least a measured temporary fuel consumption related to specific work task or to operation at a logging site, and a parameter describing an operational state of the forestry machine;

processing in the control unit of the forestry machine, the collected data to detect high fuel consumption related to specific work task or to operation at the logging site;

conveying feedback about fuel consumption of the hydraulic system of the forestry machine to a driver and guiding the driver to change his or her control, so as to reach a lower fuel consumption and/or higher productivity.

\* \* \* \* \*